UNITED STATES PATENT OFFICE.

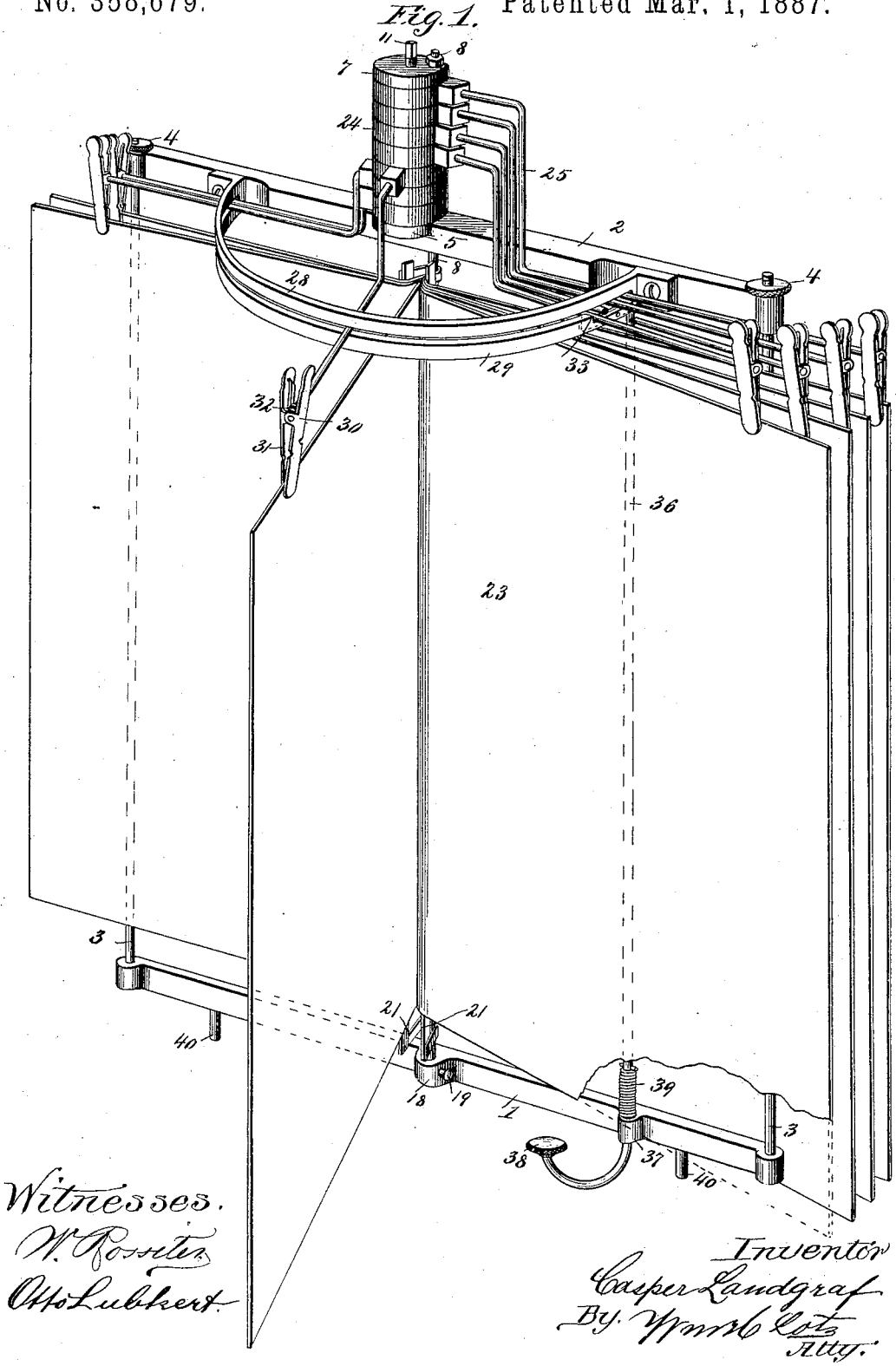

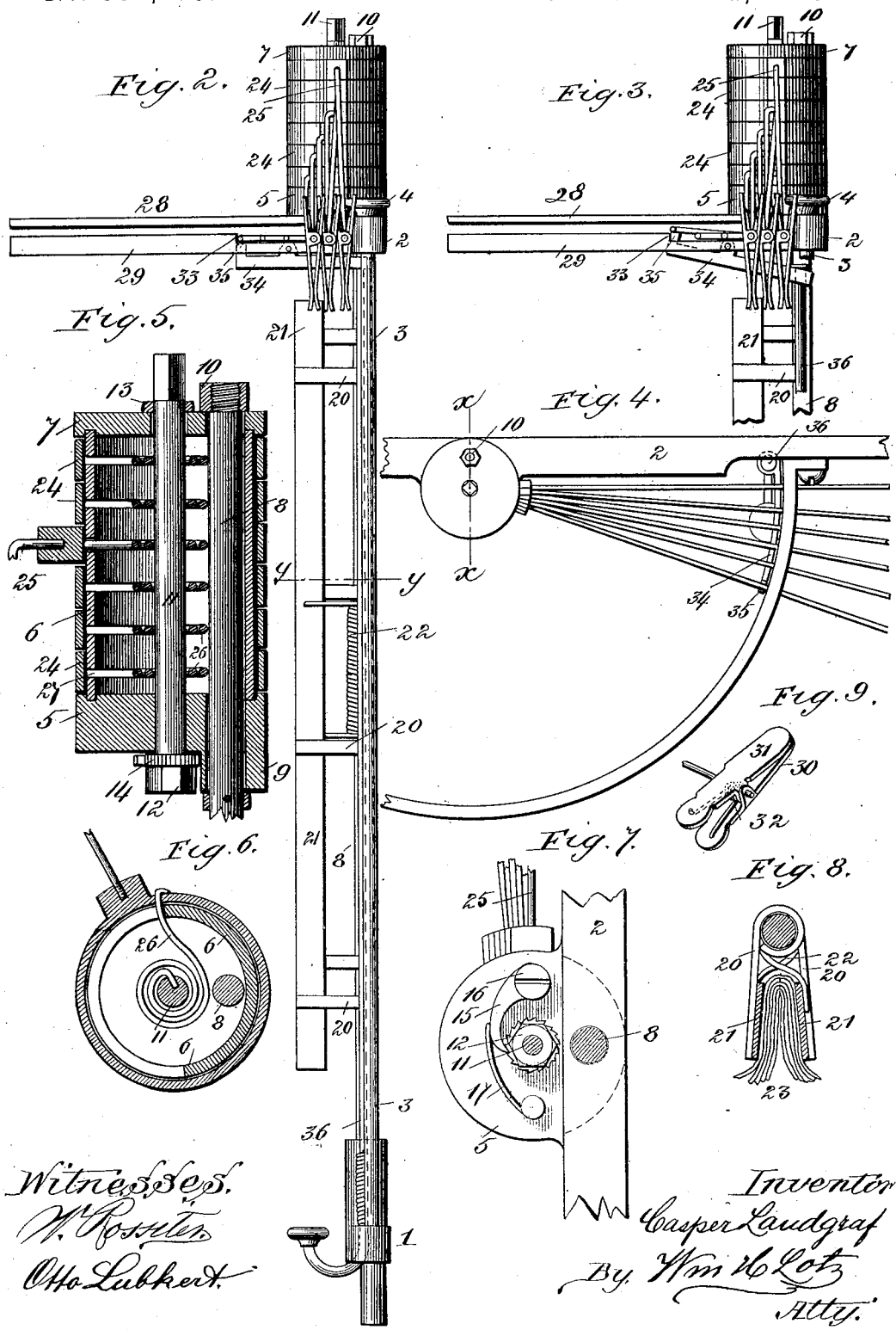

CASPER LANDGRAF, OF CHICAGO, ILLINOIS.

MUSIC-LEAF TURNER.

SPECIFICATION forming part of Letters Patent No. 358,679, dated March 1, 1887.

Application filed October 5, 1886. Serial No. 215,408. (No model.)

*To all whom it may concern:*

Be it known that I, CASPER LANDGRAF, a subject of the Emperor of Germany, residing at Chicago, in the county of Cook and State of Illinois, have invented certain new and useful Improvements in Music-Leaf Turners, of which the following is a specification, reference being had therein to the accompanying drawings.

This invention relates to devices for facilitating and accelerating the turning of the leaves of sheet-music by the performer while playing on piano or another musical instrument; and it has for its object to provide an attachment or apparatus that is adapted to hold the book, and has arms connecting with the several leaves of the book, and that is arranged so that by touching a conveniently-placed handle the leaves will be turned automatically in their successive order. For that purpose my invention consists of the novel devices and combinations of devices, hereinafter described and specifically claimed.

In the accompanying drawings, Figure 1 represents a perspective view of the entire apparatus with sheet-music attached; Fig. 2, an edge view of the same in position before or after turning a leaf. Fig. 3 is a partial edge view in position of disengaging one of the arms for turning a leaf; Fig. 4, a plan view of the apparatus; Fig. 5, a longitudinal section on line $x$ $x$ in Fig. 4 of the arm-holding tube and rings; Fig. 6, a transverse section of the same; Fig. 7, a sectional end view of the same; Fig. 8, a cross-section on line $y$ $y$ in Fig. 2 of the book-holding clamp, and Fig. 9 a detached view of one of the leaf-holding clamps.

Similar reference-characters in the several figures of the drawings designate like parts.

The frame of the apparatus is composed of bottom bar, 1, and top bar, 2, both having eyes to their ends for securing them proper distance apart by vertical rods 3, rigidly fixed in bar 1, and detachably connected with bar 2 by thumb-nuts 4. The center of upper bar, 2, has a hub, 5, having an annular groove in its upper face for inserting one end of a cylindrical tube, 6, the opposite end of which is covered by a circular plate, 7, also having an annular groove for engaging such tube 6. The tube 6 is clamped between hub 5 and plate 7 by the end of rod 8 between collar 9 of such rod and screw-nut 10. This rod 8 is passed through holes of central hub, 5, and plate 7, which holes being on an eccentric position and close to the rear wall of tube 6, and through the center of such hub 5, tube 6, and plate 7 is passed a spindle, 11, having a squared end for engaging a winding-key, and being held from lateral play by head 12 and collar 13, and between head 12 and hub 5 is rigidly secured upon such spindle a ratchet-wheel, 14, engaging a pawl, 15, which is pivotally secured against the face of hub 5 by a screw, 16, and is held in engagement with ratchet-wheel 14 by a leaf-spring, 17. The rod 8 extends downward, with its lower extremity entering a central hub, 18, of bar 1, into which it is secured by a set screw, 19, and upon this rod are pivoted the eyed arms 20 of two jaw-plates, 21, that are pushed toward each other by a spiral spring, 22, in a manner to form a clamp for holding the folded edge of the music-sheets 23.

Upon tube 6 are sleeved a series of rings, 24, each with a protuberance, into which is secured a wire arm, 25, and upon spindle 11 are secured and coiled a series of springs, 26, the exterior ends of which are passed through slots 27, semi-circularly cut into tube 6, and are then secured each such spring to a ring, 24, in a manner that by turning spindle 11 all the springs 26 are wound up simultaneously, and that each such arm 25 will be swung by its spring one-half of a revolution.

Upon bar 2 are secured two semicircular bow-plates, 28 and 29, being concentric with spindle 11 and sufficiently apart to form guides for the radial arms 25, all of which arms are bent angularly from their rings 24, to be radially in line with each other and in successive position between bow-plates 28 and 29.

Upon the extremity of each radial arm 25 is rigidly secured a jaw-plate, 30, the other jaw-plate, 31, being pivoted to plate 30, with a spring, 32, inserted between the tail ends of such plates to push them apart, and thereby to press the down ends upon each other, thus forming clamps that will hold each the upper exterior edge of a leaf of sheet-music.

Bow-plate 29 is notched out to form a shoulder, 33, behind which the several arms 25 are turned and locked against the tension of springs 26, and a small lever, 34, pivoted at about its center against the inward face of bow-plate 29, has to its outward swinging end a projection, 35, that moves in line with shoulder 33, while its opposite swinging end has formed an eye for connecting a rod, 36, which extends to bar 1, where it is passed through loop 37 of such bar 1, having formed to its lower extremity a curved handle with a knob, 38. A spiral spring, 39, surrounding such rod 36 between a cross-pin thereof and loop 37, pushes such bar upward and holds the projection 35 of lever 34 out of contact with arms 25; but with pulling rod 36 downward the lever 34 is swung in the direction that its projection 35 will push the uppermost arm 25, that is in actual contact with shoulder 33, from under such shoulder, thereby liberating it to be acted upon by its spring 26, when such arm 25, with the leaf of sheet-music connected, will be turned to the opposite side.

Studs 40, projecting from the under side of bar 1, are to be inserted into corresponding holes bored into the sheet-supporting strip of the music-stand, for detachably holding the attachment on its proper position thereon.

The music-sheets being secured with their folded or binding edge between the clamp-jaws 21, each leaf thereof is coupled to one of the arms 25 by clamps 30 31 in proper successive order, and the springs 26 being wound up and held to proper tension by stem 11, ratchet-wheel 14, and pawl 15, the apparatus is placed upon the music-stand and the arms are turned and locked behind shoulder 33. Now, when the performer wants to turn a leaf, a small pressure upon handle-knob 38 suffices to liberate the proper arm holding the next leaf from under shoulder 33, when such arm will swing one-half of a revolution, carrying the leaf with it, and so one leaf after the other in correct successive order will be turned with each touch of handle-knob 38 at the desired movement.

When desirable, the rod 36 may be connected in a convenient manner with a treadle for operating the leaf-turner by a depression with the foot.

What I claim is—

In a leaf-turner, the combination, with clamp 21, of slotted tube 6, spindle 11, springs 26, and rings 24, with arms 25 and clamps 30 31, all substantially as set forth, to operate as specified.

In testimony whereof I affix my signature in presence of two witnesses.

CASPER LANDGRAF.

Witnesses:
WM. H. LOTZ,
OTTO LUBKERT.